US009179097B2

(12) United States Patent
Kuscher et al.

(10) Patent No.: US 9,179,097 B2
(45) Date of Patent: Nov. 3, 2015

(54) CONTROL OF A VIDEO CONFERENCE SYSTEM USING PERSONAL DEVICES

(71) Applicant: Google Inc., Mountain View, CA (US)

(72) Inventors: Alexander Friedrich Kuscher, San Francisco, CA (US); Zelidrag Hornung, Los Gatos, CA (US)

(73) Assignee: GOOGLE INC., Mountain View, CA (US)

( * ) Notice: Subject to any disclaimer, the term of this patent is extended or adjusted under 35 U.S.C. 154(b) by 84 days.

(21) Appl. No.: 14/061,611

(22) Filed: Oct. 23, 2013

(65) Prior Publication Data

US 2015/0109399 A1 Apr. 23, 2015

(51) Int. Cl.
  *H04N 7/15* (2006.01)
  *H04L 29/06* (2006.01)

(52) U.S. Cl.
  CPC .............. *H04N 7/15* (2013.01); *H04L 65/403* (2013.01)

(58) Field of Classification Search
  CPC ............ H04N 7/15; H04N 1/00; H04N 7/14; G06F 15/16; H04L 12/12; H04M 3/42
  USPC ............................. 348/14.01–14.15; 709/204
  See application file for complete search history.

(56) References Cited

U.S. PATENT DOCUMENTS

| 8,294,747 | B1 | 10/2012 | Weinberg et al. |
| 8,874,090 | B2* | 10/2014 | Abuan et al. ................. 455/416 |
| 2010/0188473 | A1* | 7/2010 | King et al. ................. 348/14.02 |
| 2011/0179182 | A1 | 7/2011 | Vadla Ravnas |
| 2011/0209177 | A1 | 8/2011 | Sela et al. |
| 2011/0279631 | A1 | 11/2011 | Ranganath et al. |
| 2013/0027505 | A1* | 1/2013 | Ranganath et al. ........ 348/14.08 |
| 2013/0109365 | A1* | 5/2013 | Buzdugan ................... 455/416 |
| 2013/0201356 | A1 | 8/2013 | Kennedy et al. |
| 2015/0067044 | A1* | 3/2015 | Bakaev ........................ 709/204 |

FOREIGN PATENT DOCUMENTS

| EP | 2469755 A1 | 6/2012 |
| KR | 10-2012-0067608 A | 6/2012 |
| WO | WO-2011/117563 A1 | 9/2011 |

* cited by examiner

*Primary Examiner* — Melur Ramakrishnaiah
(74) *Attorney, Agent, or Firm* — McDermott Will & Emery LLP

(57) ABSTRACT

A system and machine-implemented method for automatically linking a mobile device to a video conference control unit of a video conference site, providing control of the video conference control unit by the mobile device. A proximity detector and a wireless controller provide automatic linking with the mobile device. The linked mobile device adds the participant using the mobile device to a video conference and also controls video conference settings or functions without the need for a central user interface.

18 Claims, 4 Drawing Sheets

CONTROL OF A VIDEO CONFERENCE SYSTEM USING PERSONAL DEVICES

BACKGROUND

The present disclosure generally relates to video conference systems and, in particular, to using a mobile device as a user interface to control a video conference system.

A video conference system is typically at a location where one or more video conference participants join with and participate in a video conference with other participants at other locations. A video conference system has a user interface for control of the video conference system at the video conference site. The user interface is typically a central device that each video conference participant at the video conference site must interact with to join the video conference (e.g., let other remote participants know the site participant is on the video conference). The user interface is also needed to control video conference features at the site (e.g., volume, camera positioning, self-display).

SUMMARY

The disclosed subject matter relates to a video conference system. The system includes a proximity detector configured to detect the presence of a mobile device. The system also includes a wireless controller configured to establish a wireless link with the mobile device in response to the proximity detector detecting the presence of the mobile device. The system further includes a control unit configured to receive a command from the mobile device via the wireless link and to control a video conference setting based on the received command.

The disclosed subject matter further relates to a computer-implemented method of providing control of a video conference system by a mobile device. The method includes detecting, by a proximity detector, the presence of a mobile device. The method also includes establishing a wireless link between the mobile device and a wireless controller based on the detected proximity of the mobile device, the wireless link providing a communication path for a command from the mobile device to be received by a control unit. The method further includes receiving the mobile device based command over the wireless link. The method also includes changing, by the control unit, one or more video conference settings based on the received command.

The disclosed subject matter also relates to a non-transitory machine-readable storage medium comprising machine readable instructions for causing a processor to execute a method for providing control of a video conference system by a mobile device. The method includes detecting, by a proximity detector, the presence of a mobile device. The method also includes providing pairing credentials from the proximity detector to the mobile device based on the detected presence of the mobile device. The method further includes establishing a wireless link between the mobile device and a wireless controller based on the pairing credentials. The method further includes receiving a mobile device based command over the wireless link. The method also includes changing a video conference setting of the video conference system based on the received command.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
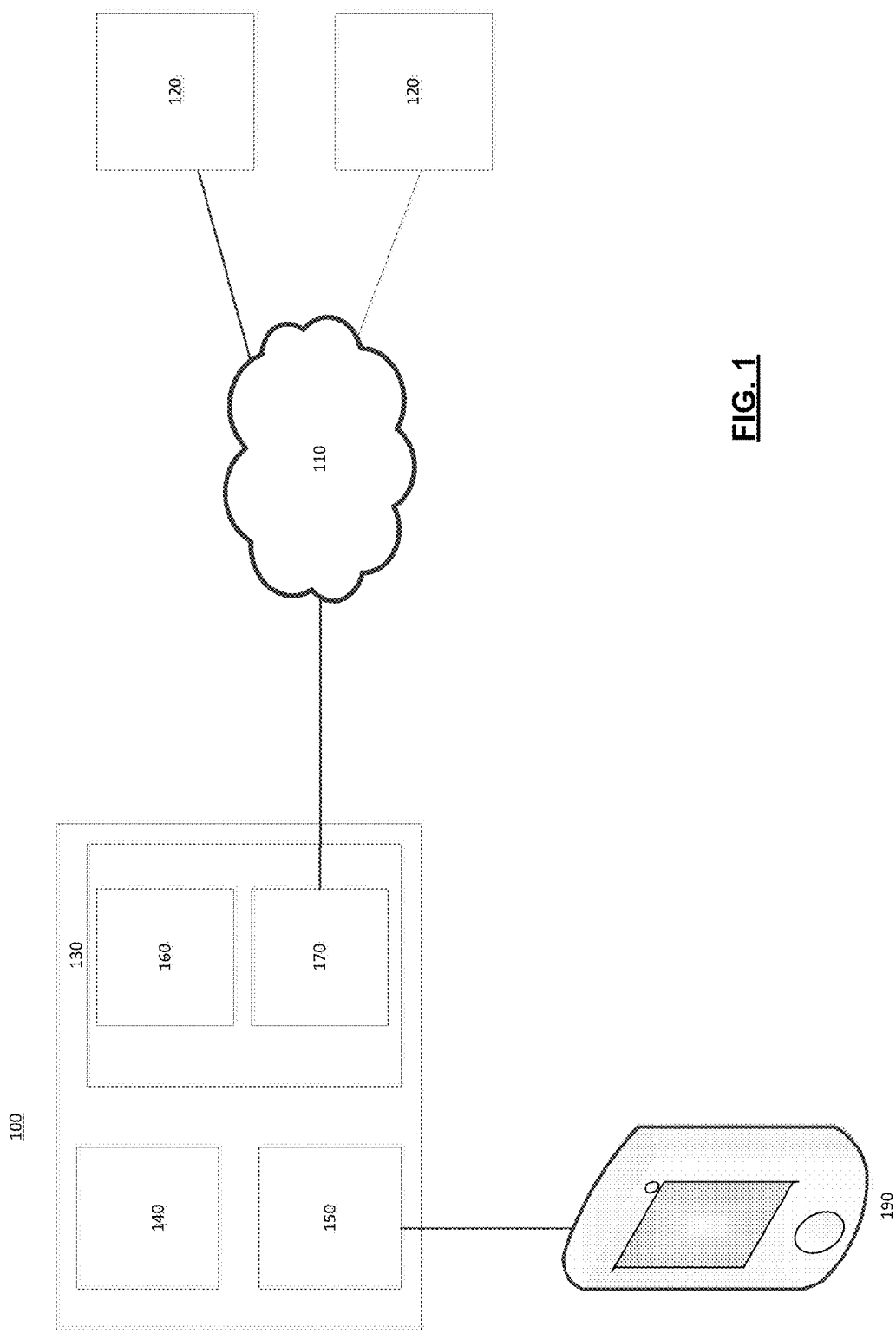
FIG. 1 illustrates an example of a video conference system for a site of a video conference.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein. In some instances, structures and components are shown in block diagram form in order to avoid obscuring the concepts of the subject technology.

As noted above, a video conference system controls a video conference at a video conference site. A video conference system typically has a central user interface for control of the video conference system, including adding participants, selecting a videoconference to attend and controlling aspects of the video conference (e.g., volume, self-display). The central user interface may be a touchscreen device located in an accessible area of the room that the video conference equipment is in. The user interface is in communication with a video conference control unit, which controls the video conference equipment in the room and interfaces with other video conference systems in locations remote from the video conference room.

A central user interface may become broken or damaged from heavy use or participant abuse. In addition, a central user interface requires a participant to be within reach for operation and typically only allows interaction with one participant at a time. Further, each participant must be entered into the central user interface for the system to know that the participant is there at the site. Also, different video conferencing systems may have different central user interfaces, making it confusing and complex for participants who use multiple video conferencing systems. It is desired to provide control of video conference systems using a user's own mobile device (e.g., smartphone, tablet computer).

The subject disclosure provides for a system that uses a participant's mobile device (e.g., smartphone, tablet computer) as the user interface to a video conference system. The participant's mobile device may be used to add the participant to the video conference, thereby letting other participants know of the addition of that participant. The participant's mobile device may be used to control video conference settings or functions (e.g., volume, self-display) without the need for a central user interface at the site. The system may also detect all mobile devices within a limited geographic radius (e.g., within 10 feet of a video conference control unit in the site) and add the users associated with the detected mobile devices as participants to the video conference.

For example, a video conference system may include one or more near field communication (NFC) tags or devices at the video conference site. A participant's mobile device may be tapped against the NFC tag to obtain the required credentials (e.g., a Bluetooth mac address) and automatically enter the participant as present on the video conference. The mobile device may use the obtained credentials to obtain a uniform resource locator (URL) that identifies a video conference control application hosted by a webserver associated with the video conference system, thereby allowing the mobile device to control the video conference system. Thus, the participant is automatically added to the video conference and the participant's mobile device automatically pairs with the video conference system to provide control of the video conference system by the mobile device, all without the user having to do anything beyond tapping the mobile device to the NFC tag.

In another example, a video conference system may include one or more Bluetooth devices configured to sense presence and/or exchange basic information. A proximity profile may be provided to allow a Bluetooth device (e.g., a proximity monitor) to detect whether another Bluetooth device (e.g., a proximity reporter) is within a close physical range. The physical proximity of a Bluetooth reporter may be estimated using a received signal strength indicator (RSSI) value of a wireless or radio receiver of the Bluetooth reporter. The Bluetooth monitor may be a Bluetooth tag that runs Bluetooth 4.0 Low Energy and the Bluetooth reporter may be a Bluetooth enabled smartphone, for example.

FIG. 1 illustrates an example of a video conference system 100 for controlling video conference services at a video conference site. For example, a company may have a video conference room with video conferencing system 100 for controlling and/or facilitating video conferences held in the video conference room. Video conference system 100 may communicate over a network 110 with remote video conference systems 120 at locations other than the company video conference room. Each of video conference system 100 and remote video conference systems 120 may be a video conference site for the location in which that system is physically located.

Video conference system 100 may include a control unit 130. Control unit 130 may control any or all of the video conference settings for the video conference room (e.g., site). For example, control unit 130 may control a display of remote participants, a display of the participants in the video conference room (e.g., self-display), camera controls, audio volume, connection to the video conference, and the like. Control unit 130 is configured to be controlled fully or in part by one or more mobile devices 190 (e.g., smartphone, tablet computer). As illustrated in FIG. 1, the mobile device 190 is a smartphone.

Video conference system 100 may also include a proximity detector 140. A proximity detector 140 may be a proximity sensor that is capacitive, inductive, magnetic, infrared, ultrasonic, and the like. Proximity detector 140 may be configured to detect the presence of any mobile devices 190 that come within a predetermined proximity of the proximity detector 140. Proximity detector 140 may be an integral component of control unit 130 or proximity detector 140 may be an external device that is connected to control unit 130. For example, the predetermined proximity may be configured as the approximate size of the video conference room (e.g., 20 feet by 20 feet) so that a mobile device 190 entering the video conference room may be detected by the proximity detector 140 and subsequently be linked with the control unit 130. Here, the proximity detector 140 may be located on the center of a conference room table that is in the center of the room, so the proximity detector 140 in this example is 10 feet from the doorway into the video conference room. Accordingly, the presence of the mobile device 190 within the video conference room may be determined by tracking the current location of the mobile device 190.

Tracking the current location of the mobile device 190 may be done by network based techniques (e.g., cell identification, triangulation, forward link timing), GPS, Assisted GPS, Wi-Fi positioning, and the like. For example, Wi-Fi positioning uses locations of Wi-Fi hotspots that each has a unique ID. The Wi-Fi positioning system uses the signal strengths of each Wi-Fi hotspot relative to each other and to cell towers to estimate the position of the mobile device 190. Thus, if the mobile device 190 and the proximity detector 140 are on the same Wi-Fi network, the location of the proximity detector 140 is known and the location of the mobile device 190 may be estimated using Wi-Fi positioning. The estimated position of the mobile device 190 may be transmitted to the proximity detector 140 and the proximity detector 140 may determine if the location of the mobile device 190 is within the predetermined proximity. If the mobile device 190 is determined to be within the predetermined proximity, the control unit 130 may provide a wireless link to the mobile device 190.

To participate in Wi-Fi positioning, the location detection option of the mobile device 190 must be authorized by the user of the mobile device 190. However, the user may opt out of the location detection process at any time (e.g., turn off location services on the mobile device 190). Continuing the above example, the current location of the mobile device 190 may be determined by Wi-Fi positioning to be 10 feet or less from the proximity detector 140. Thus, the mobile device 190 may be determined to be within the predetermined proximity (e.g., within the 20 feet by 20 feet area) and a wireless link may be established between the control unit 130 and the mobile device 190. The mobile device 190 may also be automatically listed as being present within the video conference room.

In another aspect, the mobile device 190 may have to physically touch or be placed very close to the proximity detector 140 to be detected. For example, a user who wishes to join a video conference may enter the video conference room and tap or bump the participant's mobile device 190 to the proximity detector 140. Here, the proximity detector 140 may be a proximity sensor that has been adjusted to a very short range, thereby causing the proximity sensor to effectively function as a touch switch.

A wireless controller 150 may also be included with video conference system 100. Wireless controller 150 may be configured to establish a wireless link with the mobile device 190. The wireless link may be established in response to detecting the presence of the mobile device 190 by the proximity detector 140. For example, a participant's mobile device 190 may be tapped against the proximity detector 140 to obtain the required wireless connection credentials (e.g., a Bluetooth mac address). A wireless link (e.g., Bluetooth link) may then be established between the mobile device 190 and the control unit 130, pairing the mobile device 190 to the control unit 130. Wireless controller 150 may be an integral component of control unit 130 or wireless controller 150 may be an external device that is connected to control unit 130 (e.g., wireless router). As another example, a participant's mobile device 190 and the proximity detector 140 may be connected to the same wireless network (e.g., Wi-Fi network), where the proximity detector 140 may be a Wi-Fi positioning system or device. Upon detection of the mobile device 190 by the Wi-Fi based proximity detector 140, a wireless link may be established between the mobile device 190 and the control unit 130 over the Wi-Fi network.

Video conference system 100 may also include a webserver 160. Webserver 160 may host a video conference control application that resides on the webserver 160 and provides for control of video conference settings of the video conference system 100. Webserver 160 may also provide the control interface that may be downloaded to the mobile device 290, the control interface interacting with the video conference control application to provide commands and data between the mobile device 290 and the video conference system 100. The webserver 160 may be configured to be accessible through the wireless link established between mobile device 190 and control unit 130. For example, once the wireless link is established between the control unit 130 and a participant's mobile device 190, the control unit 130 may provide a URL to the mobile device 190 of the video conference control application hosted by the webserver 160.

The mobile device 190 may open or launch a control interface that interacts with the video conference control application, providing for control of available video conference settings from the mobile device 190. For example, the control interface on the mobile device 190 may include a volume control bar that allows the user to drag a button along the volume control bar, thereby issuing a command to raise the volume of speakers in the video conference room. The raise volume command may be sent from the control interface of the mobile device 190 to the video conference control application on the webserver 160. The video conference control application may then provide a raise speaker volume instruction to the control unit 130, to which the control unit 130 raises the speaker volume the instructed amount.

A communication unit 170 may also be included in video conference system 100. Communication unit 170 may be configured to communicate with other remote video conference systems 120 through the network 110. For example, a single building may have a video conference room on each of five floors of the building, where the first floor video conference room has a video conference system 100 and each other video conference room on floors two through four has a remote video conference system 110. The network 110 connecting the five video conference systems 100, 110 may be a wired network, a wireless network, or a combination of both. In another example, the remote video conference systems 110 may be scattered about the country or the world. In addition, remote participants may be able to participate in the video conference directly from a mobile device 190. For example, a participant may have a tablet computer with a camera lens that faces the participant, where the tablet computer has a video conferencing application that allows the tablet computer to function as a video conference site.

Figure 2:
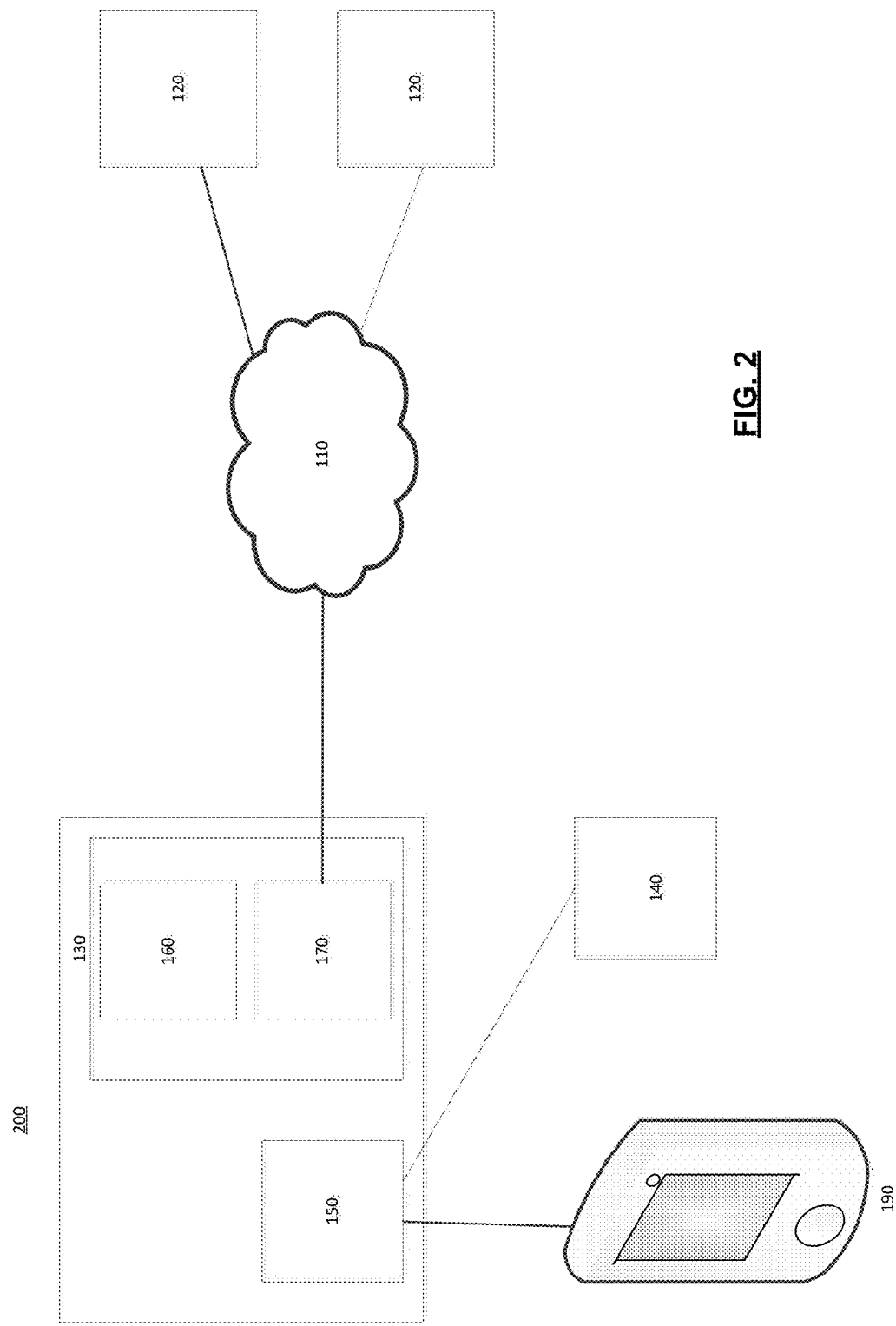
FIG. 2 illustrates another example of a video conference system for a site of a video conference.

As illustrated in FIG. 1, control unit 130, proximity detector 140, wireless controller 150, webserver 160 and communication unit 170 may all be combined as an integrated video conference system 100 (e.g., single video conference box or enclosure). Alternately, some elements may be integrated together and others may be separate devices. For example, as illustrated in FIG. 2, video conference system 200 may include control unit 130, wireless controller 150, webserver 160 and communication unit 170 all integrated in one enclosure, while proximity detector 140 is a separate standalone device (e.g., a standalone NFC tag). For example, the integrated enclosure of video conference system 200 may be mounted in a wall cabinet of the video conference room while the proximity detector 140 may be located on the center of a conference room table or mounted on the wall near the doorway into the room.

Figure 3:
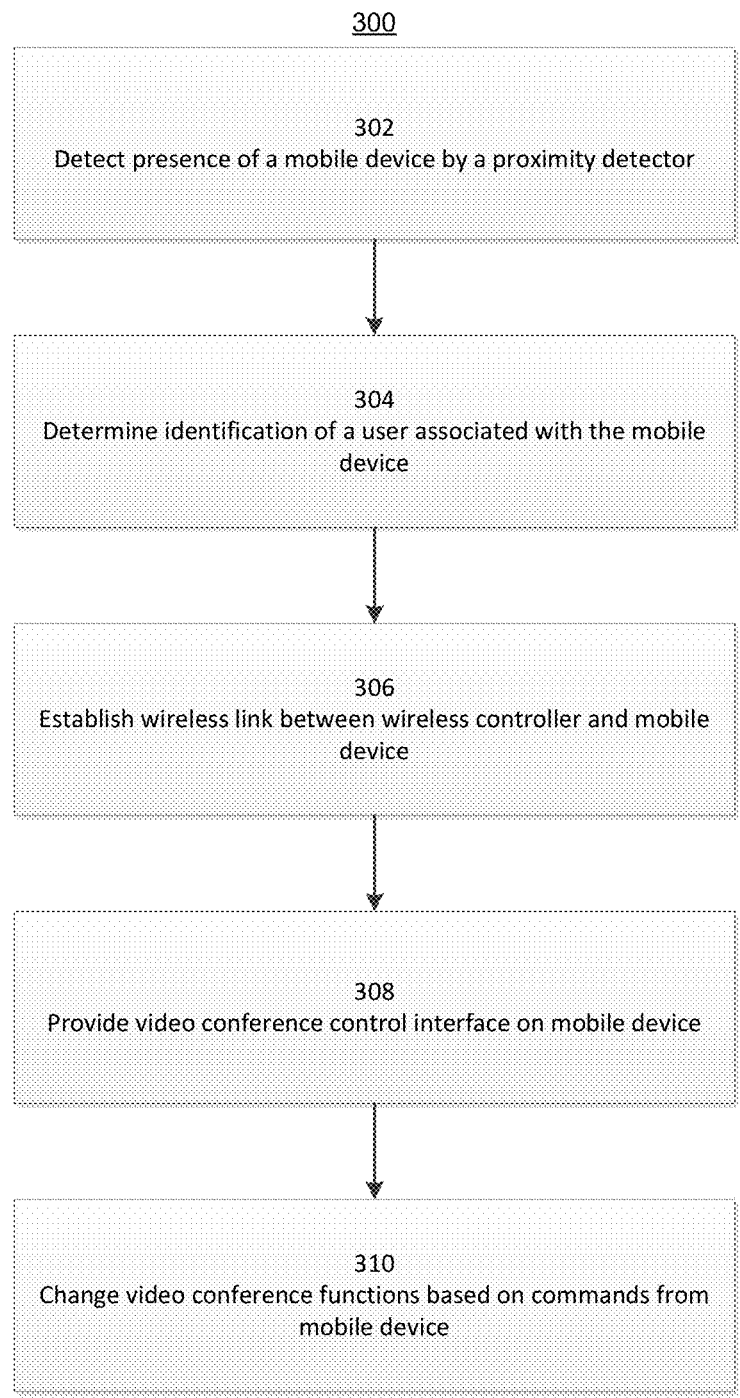
FIG. 3 illustrates an example process which provides for controlling a video conference system with a mobile device.

FIG. 3 illustrates an example process 300 which provides for controlling a video conference system with a mobile device. The process 300 begins at step 302 where a video conference system proximity detector detects the presence of a mobile device. For example, a user may enter a video conference room and tap the user's smartphone to an NFC tag on the conference room table. In response to the detection of the mobile device by the proximity sensor, the identification of a user associated with the mobile device may be determined and the identified user may be automatically listed as present in the video conference room at step 304. For example, after detecting a smartphone has entered the video conference room, the user associated with the smartphone may be automatically added to the list of participants on the current video conference taking place in the video conference room.

At step 306, a wireless link is established between a wireless controller of the video conference system and the mobile device. Continuing the above example, the tap of the smartphone on the NFC tag provides the smartphone with a Bluetooth mac address that may be used to establish a Bluetooth link between the wireless controller and the smartphone. At step 308, the mobile device launches a video conference control application on the mobile device, the video conference control application being hosted on a webserver of the video control system. For example, once the wireless link is established between the smartphone and the wireless controller, a control unit may provide a URL for a control interface to the smartphone via the wireless link, where following the URL to the webserver allows the video conference control application to be opened on the smartphone.

The process 300 ends at step 310 where the commands entered on the control interface of the mobile device cause the video conference control unit to make changes to the video conference system. Here, a command entered into the control interface may be communicated over the wireless link between the mobile device and the wireless controller, the command passed to the video conference control application on the webserver, and the video conference control application sending the command or a corresponding command to the control unit, the control unit making the change to the video conference settings dictated by the command. For example, the newly added participant may use a smartphone to issue commands to raise the volume of speakers in the video conference room and change the camera angle of the camera in the video conference room. The commands are received by the video conference system and the control unit raises the speaker volume and changes the camera angle. As another example, since the participant associated with the smartphone is identified when the smartphone is paired or linked with the video conference control unit, only a listing of scheduled video conferences for the video conference room that are relevant to the participant may be provided on the smartphone. This eliminates the participant from having to go through a list of video conferences set up for that control unit that have no relevance to that particular user.

The described systems and processes may provide for control of the video conference system by one or more mobile devices, thereby eliminating the need for a central user interface. For example, three different people in a video conference room may each have a mobile device that is linked or paired to the video conference system as described in process 300. Thus, each one of the three people may be automatically added to the current video conference in the room and each person may be able to control the video conference system from his or her mobile device. In one aspect, the video conference control application may allow any listed participant to control the video conference settings. Conflicts between competing participant commands may be resolved using any suitable conflict resolution process, such as last one in wins, time out intervals between received commands, and the like. In another aspect, only one participant at a time may be allowed to control the video conference system (e.g., the moderator, the person who set up the video conference). In yet another aspect, the video conference system may interact with multiple participants at the same time, such as allowing an established participant to control video conference settings while simultaneously detecting new mobile devices and establishing the users of the detected mobile devices as new participants in the video conference.

Figure 4:
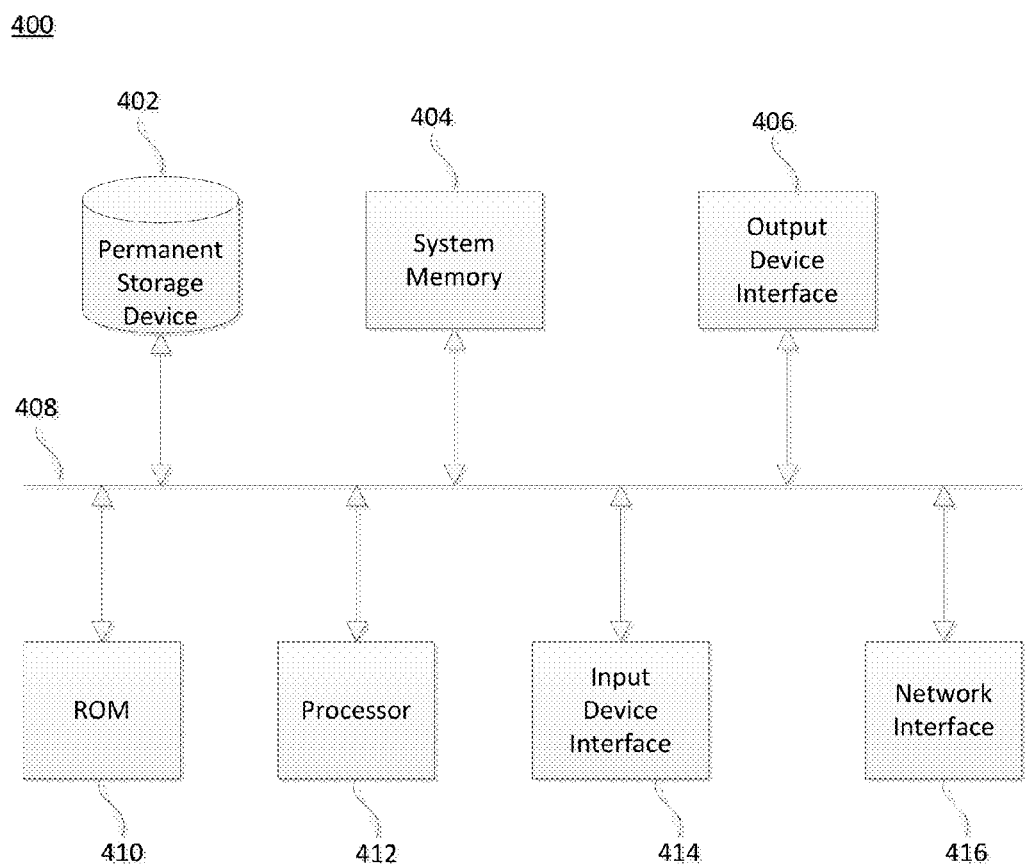
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for linking and controlling video conference settings in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, liquid crystal displays (LCD). Some implementations include devices, for example, a touchscreen that functions as both input and output devices.

Further, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., an LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A video conference system comprising:
a proximity detector configured to detect the presence of a plurality of mobile devices within a predetermined proximity of the proximity detector;
a wireless controller configured to establish a wireless link with each mobile device in response to the proximity detector detecting the presence of the mobile device; and
a control unit configured to:
automatically add a plurality of users associated with the plurality of mobile devices as participants to a scheduled video conference;
designate one of the plurality of mobile devices as a control mobile device having control of one or more video conference settings;
receive a command from the control mobile device via the wireless link; and
control a video conference setting based on the received command.

2. The video conference system of claim 1, wherein the proximity detector comprises a near field communication (NFC) device configured to provide pairing credentials to the mobile device for establishing the wireless link in response to the mobile device being proximate to the NFC device.

3. The video conference system of claim 1, wherein the proximity detector is configured to detect the presence of the mobile device based on a determined location of the mobile device relative to a location of the proximity detector.

4. The video conference system of claim 1, wherein the proximity detector is configured to detect the mobile device upon physical contact of the mobile device with the proximity detector.

5. The video conference system of claim 1, wherein the proximity detector comprises a Wi-Fi positioning system configured to estimate the location of the mobile device.

6. The video conference system of claim 1, wherein the wireless link is a Bluetooth link or a Wi-Fi link.

7. The video conference system of claim 1, wherein the control unit is further configured to provide a uniform resource locator (URL) for a control interface to the control mobile device via the wireless link, and
wherein the control interface is configured to send the command from the control mobile device.

8. The video conference system of claim 7, wherein the control unit further comprises a webserver configured to host a video conference control application accessible by the control interface on the control mobile device, the video conference control application configured to control the control unit.

9. The video conference system of claim 1, further comprising a communication unit configured to communicate with one or more remote video conference systems.

10. A computer-implemented method of providing control of a video conference system by a mobile device, the method comprising:
detecting, by a proximity detector, the presence of a plurality of mobile devices within a predetermined proximity of the proximity detector;
establishing a wireless link between each mobile device and a wireless controller based on the detected proximity of the mobile device, each wireless link providing a communication path for a command from the linked mobile device to be received by a control unit;
automatically adding a plurality of users associated with the detected plurality of mobile devices as participants to a scheduled video conference;
designating, by the control unit, one of the plurality of mobile devices as a control mobile device having control of one or more video conference settings;
receiving, from the control mobile device, a command over the wireless link; and
changing, by the control unit, one or more video conference settings based on the received command.

11. The method of claim 10, wherein the proximity detector detects the mobile device through a Bluetooth signal and provides pairing credentials to the mobile device for establishing the wireless link in response to the mobile device being detected.

12. The method of claim 10, wherein the mobile device is detected based on a determined location of the mobile device relative to a location of the proximity detector.

13. The method of claim 10, wherein the wireless link is established over a Bluetooth link or a Wi-Fi link.

14. The method of claim 10, further comprising providing to the control mobile device a uniform resource locator (URL) via the wireless link and providing access to a video conference control application pointed to by the URL.

15. A non-transitory machine-readable storage medium comprising machine readable instructions for causing a processor to execute a method for providing control of a video conference system by a mobile device, the method comprising:
detecting, by a proximity detector, the presence of a plurality of mobile devices within a predetermined proximity of the proximity detector;
providing pairing credentials from the proximity detector to each mobile device based on the detected presence of the mobile device;
establishing a wireless link between each mobile device and a wireless controller based on the pairing credentials;
automatically adding a plurality of users associated with the detected plurality of mobile devices as participants to a scheduled video conference;
designating, by the control unit, two or more of the plurality of mobile devices as control mobile devices having control of one or more video conference settings;
receiving mobile device based commands over the wireless links;
resolving, by the control unit, conflicts between competing commands from the two or more control mobile devices; and
changing a video conference setting of the video conference system based on the resolved command.

16. The storage medium of claim 15, wherein the mobile device is detected by a near field communication (NFC) device, the NFC device providing Bluetooth pairing credentials to the mobile device for establishing the wireless link in response to the mobile device being proximate to the NFC device.

17. The storage medium of claim 15, wherein the mobile device is detected by a determined location of the mobile device relative to a location of the proximity detector and the wireless link is established over a Wi-Fi link.

18. The storage medium of claim 15, wherein a uniform resource locator (URL) is provided to the control mobile devices via the wireless links, wherein the control mobile devices access a video conference control application pointed to by the URL.

* * * * *